US010292024B2

(12) United States Patent
DeLuca et al.

(10) Patent No.: US 10,292,024 B2
(45) Date of Patent: *May 14, 2019

(54) INITIATING ACTIONS BASED ON MOBILE DEVICE LOCATION (71) Applicant: International Business Machines Corporation, Armonk, NY (US)

(72) Inventors: Lisa Seacat DeLuca, Baltimore, MD (US); Steve McDuff, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,904

(22) Filed: May 11, 2018

(65) Prior Publication Data

US 2018/0352401 A1    Dec. 6, 2018

Related U.S. Application Data (63) Continuation of application No. 15/783,112, filed on Oct. 13, 2017, now Pat. No. 10,064,018, which is a continuation of application No. 15/610,888, filed on Jun. 1, 2017, now Pat. No. 10,149,113.

(51) Int. Cl.
*H04W 4/30* (2018.01)
*G06Q 30/02* (2012.01)
*H04W 4/04* (2009.01)
*H04W 4/021* (2018.01)

(52) U.S. Cl.
CPC .......... *H04W 4/30* (2018.02); *G06Q 30/0261* (2013.01); *G06Q 30/0267* (2013.01); *H04W 4/021* (2013.01); *H04W 4/04* (2013.01)

(58) Field of Classification Search
None
See application file for complete search history.

(56) References Cited

U.S. PATENT DOCUMENTS

| 9,436,967 B2 | 9/2016 | Dempski |
| 2012/0042036 A1* | 2/2012 | Lau .......................... G06F 8/61 709/217 |
| 2013/0324097 A1 | 12/2013 | Roberts et al. |

(Continued)

OTHER PUBLICATIONS

Disclosed Anonymously, "Prediction of Zone Entry based on Current Speed and Directionality of a Device", An IP.com Prior Art Database Technical Disclosure, IP.Com No. IPCOM000247275D, Publication date: Aug. 18, 2016, 1 page.

(Continued)

*Primary Examiner* — Frantz Bataille
(74) *Attorney, Agent, or Firm* — Edward J. Wixted, III (57) ABSTRACT Aspects of the present invention disclose a method, computer program product, and system for initiating actions based on mobile device location of a user. The method includes one or more processors determining that a user is within a defined proximity to a zone within a venue, based on monitoring a computing device of the user moving through the venue. The method further includes one or more processors identifying an action associated with the zone, where the action includes performing a function of the computing device of the user. The method further includes one or more processors initiating the identified action associated with the zone on the computing device of the user.

1 Claim, 4 Drawing Sheets

(56) References Cited

U.S. PATENT DOCUMENTS

2014/0123022 A1\* 5/2014 Lee .................. H04M 1/72566
  715/747
2015/0201305 A1\* 7/2015 Edge .................... H04W 4/021
  455/456.3

OTHER PUBLICATIONS

DeLuca et al., "Initiating Actions Based on Mobile Device Location", U.S. Appl. No. 15/610,888, filed Jun. 1, 2017, 43 pages.
DeLuca et al., "Initiating Actions Based on Mobile Device Location", U.S. Appl. No. 15/783,112, filed Oct. 13, 2017, 27 pages.
DeLuca et al., "Initiating Actions Based on Mobile Device Location", U.S. Appl. No. 15/976,895, filed May 11, 2018, 27 pages.
IBM, "List of Patents Treated As Related", Appendix P, Filed Herewith, 2 pages.

\* cited by examiner

INITIATING ACTIONS BASED ON MOBILE DEVICE LOCATION

BACKGROUND

The present invention relates generally to the field of mobile devices and more particularly to mobile device proximity marketing.

Proximity marketing, sometimes called hyperlocal marketing, uses mobile device technology to send marketing messages to mobile device users who are in close proximity to a business. The market is defined by those with Bluetooth or Wi-Fi technology, and the message is sent out electronically by businesses hoping to digitally connect with nearby consumers.

Proximity marketing is the localized wireless distribution of advertising content associated with a particular place. Transmissions can be received by individuals in that location who wish to receive the transmissions. Distribution can be via a traditional localized broadcast, or more commonly is specifically targeted to devices known to be in a particular area. Communications may be further targeted to specific groups within a given location. Use of proximity marketing include distribution of media at concerts, information, gaming, social applications, and advertising.

SUMMARY

According to one embodiment of the present invention, a method for initiating actions based on mobile device location of a user is provided. The method for initiating actions based on mobile device location may include one or more processors determining that a user is within a defined proximity to a zone within a venue, based on monitoring a computing device of the user moving through the venue. The method further includes one or more processors identifying an action associated with the zone, wherein the action includes performing a function of the computing device of the user. The method further includes one or more processors initiating the identified action associated with the zone on the computing device of the user.

DETAILED DESCRIPTION

Figure 1:
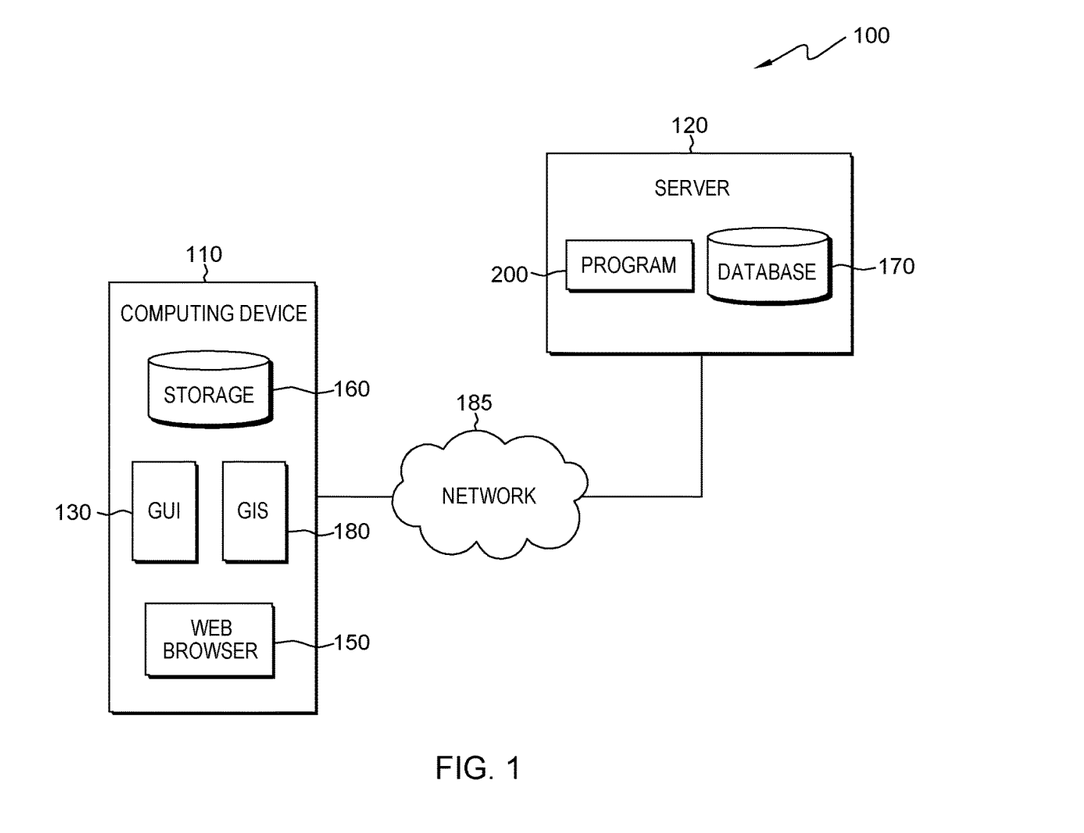
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, illustrating distributed data processing environment 100. Distributed data processing environment 100 includes computing device 110 and server 120, interconnected over network 185.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 185, as is common in data centers and with cloud computing applications. In general, computing device 110 is representative of any programmable electronic device or combination of programmable electronic devices capable of executing machine-readable program instructions and communicating with other computer devices via a network.

In one embodiment, computing device 110 includes graphical user interface (GUI) 130, web browser 150, storage 160, and geographic information system 180. In another embodiment, program 200 can be remotely hosted to another computing device accessible by network 185. The various programs on computing device 110 include web browser 150, an electronic mail client, security software (e.g., a firewall program, a geo-locating program, an encryption program, etc.), an instant messaging (IM) application (app), and a communication (e.g., phone) application.

In one embodiment, graphical user interface 130 operates on computing device 110. In another embodiment, graphical user interface 130 operates on another computer in a server based setting, for example on a server computer (e.g., server 120). In yet another embodiment, graphical user interface 130 operates on computing device 110 simultaneously with a server computer interconnected through network 185. Graphical user interface 130 may be any user interface used to access information from computing device 110, such as information gathered or produced by program 200. Additionally, graphical user interface 130 may be any user interface used to supply information to computing device 110, such as information supplied by a user to be used by program 200. In some embodiments, graphical user interface 130 may be web browser 150 used to retrieve, present, and negotiate resources from the Internet. In other embodiments, graphical user interface 130 may be a software or application that enables a user at computing device 110 access to network 185.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to computing device 110, which may operate utilizing wired (e.g., USB port) or wireless network communications (e.g., infrared, NFC, etc.). Computing device 110 may include components, as depicted and described in further detail with respect to FIG. 4, in accordance with embodiments of the present invention.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of computing device 110 to access a webpage over network 185. In the depicted environment, web browser 150 resides on computing device 110. In other embodiments, web browser 150, or similar web browsers, may reside on other computing devices capable of accessing a webpage over network 185.

Storage 160, a database, located on computing device 110, represents any type of storage device capable of storing data that is accessed and utilized by computing device 110. In other embodiments, storage 160 represents multiple storage devices within computing device 110. Storage 160 stores information such as, but not limited to, account information, credentials for authentication, user preferences, lists of preferred users, previously visited websites, history of visited Wi-Fi portals, and the history of the location of the computing device.

Geographic information system (GIS) 180 is a system designed to capture, store, manipulate, analyze, manage, and present all types of geographic data. In general, a GIS describes any information system that integrates, stores, edits, analyzes, shares, and displays geographic information. Computing device 110 can allow server 120, through a handshake, to remotely access GIS 180 on computing device 110. In some embodiments, GIS 180, on computing device 110, contains GPS receivers. In other embodiments, GIS 180 contains radio-frequency identification (RFID) tags. In still other embodiments, GIS 180 contains other sensors and/or receivers used by program 200 to determine the location of computing device 110. GIS 180 may utilize GPS or triangulation techniques to determine the physical location of computing device 110.

In another example, GIS 180 may utilize a series of RFID tag readers to locate a server with an RFID tag. GIS 180 contains a globally unique identifier (GUID) that is assigned for each computing device. The GUID can be the media access control (MAC) address for the device. The device is tracked through the GUID located on GIS 180.

GIS 180 operates to enhance program 200 to increase the accuracy or amount of location-related information obtained. GIS 180 utilizes GUID information, combined with a sampling of data collected by GIS 180, to make determinations about the location of computing device 110. GIS 180 may receive a series of data points collected by the GUID. GIS 180 may use the received data points to create a path and compare that path to GUID information corresponding to the location of the received data points.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud computing applications. In general, server 120 is representative of any programmable electronic device or combination of programmable electronic devices capable of executing machine-readable program instructions and communicating with other computer devices via a network. In one embodiment, server 120 includes program 200 and database 170.

In an embodiment, server 120 is capable of initiating a handshake process between server 120 and computing device 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a message to computing device 110 indicating that server 120 wants to establish a communication channel in order to gain access to programs, such as GIS 180, on computing device 110.

Database 170 may be a repository that may be read by geographic information system (GIS) 180. GIS data and information, such as maps, floor plans, geographic information, location names, and other information may be stored to database 170. In some embodiments, GIS 180 may access and retrieve information from database 170. In other embodiments, a program on server 120 (not shown) may prompt and update database 170 with information. The data stored to database 170 may be changed or updated by data input by a user, such as a user with access to server 120. In one embodiment, database 170 resides on server 120. In other embodiments, database 170 may reside on another server, another computing device, or mobile device, provided that database 170 is accessible to GIS 180.

In general, network 185 can be any combination of connections and protocols that will support communications among computing device 110. Network 120 can include, for example, a local area network (LAN), a wide area network (WAN), such as the Internet, a cellular network, or any combination of the preceding, and can further include wired, wireless, and/or fiber optic connections.

In one embodiment, program 200 operates on computing device 110. In another embodiment, program 200 operates on another computer in a server based setting, for example on a server computer. In yet another embodiment, program 200 operates on computing device 110 simultaneously with a server computer interconnected through network 185. Program 200 provides the capability to optimize a search engine for shopping based on the current location of a user. Program 200 is capable of utilizing Wi-Fi technology, Bluetooth, Near Field Communication tags (NFC), Global System for Mobile Communications (GSM), and Global Positioning System Technology (GPS) to communicate with the computing device of a user.

In one embodiment, program 200 tracks the movement of a computing device (e.g., computing device 110) within a space or region, defined by the beacon of a department store. The beacon is broadcasting equipment at a particular location. The beacon sends information to the computing device of a receptive user, which can be text, images, audio or video to enabled computing devices within the range of the beacon.

In an example embodiment, program 200 operates as a code snippet within one or more applications on computing device 110. Code snippets define the scope of interactivity between the snippets and the application, (e.g., program 200 hosted by a web browser application on server 120). For example, program 200 is a function within web browser 150, and the processes of program 200 occur automatically (i.e., without user intervention) during operation of web browser 150 as initiated by program 200. The dynamic code snippet elements provide scripting support. The variables enable dialog between program 200, through server 120, graphical user interface 130, and web browser 150.

In one embodiment, program 200 has the ability to access computing device 110 to establish a two-way communication link based upon the location of a user within a designated zone. In this embodiment, program 200 can determine and track the location of a user within defined zones.

In another embodiment, program 200 has the ability to automatically populate the web browser of a user with real-time information directed to indoor navigation. In this example, program 200 can provide a user with the location of beacons that define zones and sub zones within a venue. A beacon can include a transreceiver that transmits a wireless beacon signal.

Figure 2:
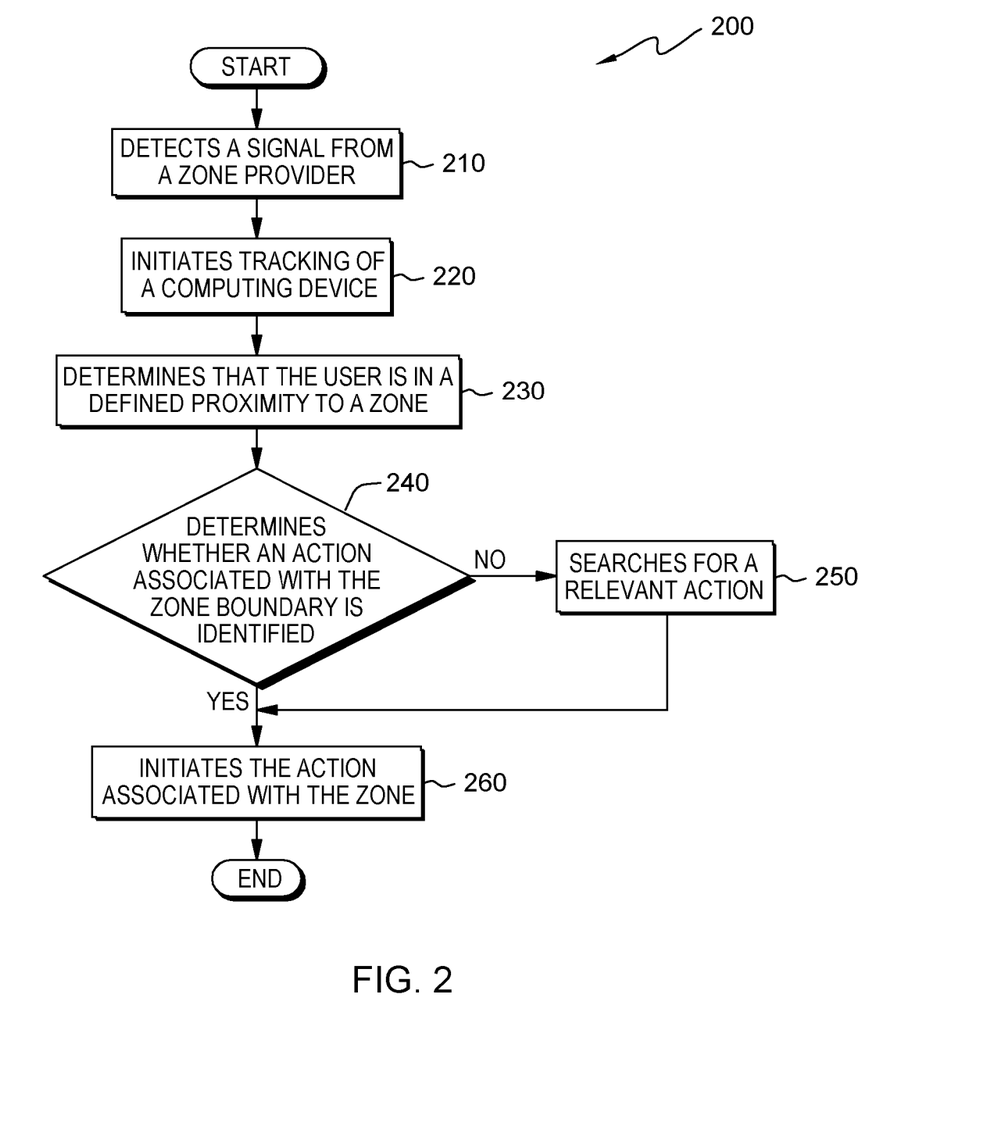
FIG. 2 is a flowchart depicting operational steps of a program for initiating actions based on mobile device location, in accordance with the present invention.

FIG. 2 is a flowchart depicting the operational steps of program 200, a program for initiating an action in response to a user entering a zone of a multi-zone provider, in accordance with an embodiment of the present invention.

In step 210, program 200 detects a signal from a zone provider. A zone provider is a source, or owner, of independent Wi-Fi network access points, such as proximity sensors, beacons, or networks of access points that are distributed in a defined space. The zone provider enables captive portals that dictate the usage of access credentials and consent for all users before enabling access to the network of the zone provider. In one embodiment, program 200 establishes a communication, through a handshake, link with computing device 110 in response to a shopper entering a shopping environment. For example, program 200 detects and grants access to the computing device 110, programs such as GIS 180 on computing device 110, within the boundaries a specified shopping zone. In this example, a zone is determined by a short range wireless system that can support many computing devices. The beacons define each zone and contain information specific to that zone. In another embodiment, program 200 detects and grants access to computing device 110 through detecting certain signals periodically emitted by the re-use of standard access point (AP) technologies with a Captive Portal. In yet another embodiment, program 200 detects and grants access to computing device 110 through the use of antennas. In this example, a zone provider uses antennas for the detection of signals in the 2.4 or 5 GHz frequency bands and places the antennas within a bounded space in order to maximize the number of computing devices detected. The antennas are positioned in areas to analyze all signals detected within the bands used by Wi-Fi.

In step 220, program 200 initiates tracking of a computing device. In one embodiment, program 200 initiates the tracking of computing device 110 through accessing GIS 180 on computing device 110. The GIS contains sensors and/or receivers that program 200 utilizes to determine the location of computing device 110. In an example, program 200 accesses GIS 180, through a handshake, to utilize GPS or triangulation techniques to determine, and update, the physical location of computing device 110 within the zone. In this example, program 200 temporarily registers the computing device of a user to constantly provide and receive feedback on the location of the user real time. In another embodiment, program 200, through GIS 180, analyzes the movement pattern of computing device 110 to plot and estimate the probability and expected time of arrival (ETA) that a user will reach a zone. In one embodiment, program 200, via server 120, issues a wireless tag to computing device 110 and receives feedback from GIS 180 of computing device 110.

Program 200 analyzes computing device 110, and multiple computing devices present in the zone, in terms of arrival time, length of visit per zone, paths of movement, and general traffic flow. Program 200 can detect the present physical location of one or more computing devices, such as computing device 110, within the venue based on data received from beacons in the venue. For example, based on the determined or estimated distance of the computing device from one beacon to a different strategically placed beacon, program 200 can determine and continuously update a corresponding location of the computing device in the venue. In another embodiment, program 200 can receive GPS information from GIS 180 of computing device 110 to determine and continuously update the computing device's location within a subzone or zone.

Figure 3:
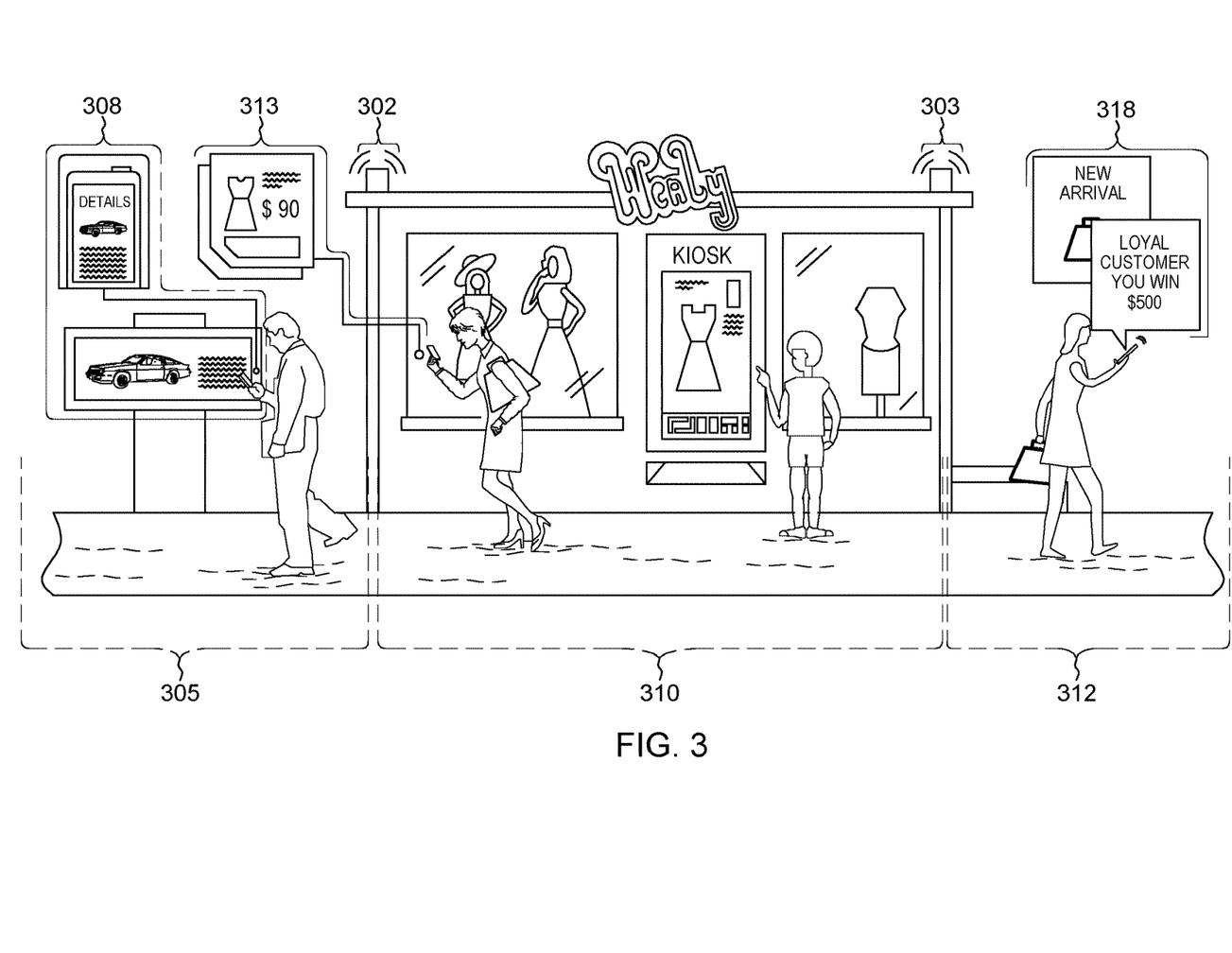
FIG. 3 illustrates an example of a program for initiating actions based on mobile device location, in accordance with an embodiment of the present invention.

FIG. 3 illustrates an example of program 200 operating in an environment and performing an action in response to the user entering a multi-zone provider, in accordance with an embodiment of the present invention. In this embodiment, program 200 operates on server 120 and monitors zone boundaries 305, 310, and 312, defined by beacon 302 and 303, to provide information 308, 313, and 318 to the computing devices of users. Information 308, 313, and 318 can include preloaded websites, programs, or closely associated websites.

In step 230, program 200 determines that the user is in defined proximity to a zone. In an embodiment, program 200, as discussed in step 220, accesses sub program GIS 180 to analyze the movement pattern of computing device 110 to plot and estimate the probability and expected time of arrival (ETA) that a user will reach a defined proximity to a zone. In this embodiment, program 200 detects the present physical location of one or more computing devices, such as computing device 110, within the venue based on feedback received from beacons in the venue. Program 200 determines and continuously updates a corresponding location of the computing device in the venue, based on the determined, or estimated, proximity of the computing device from one beacon to a different strategically placed beacon. In another embodiment, program 200 receives GPS information, from GIS 180 of computing device 110, to determine and continuously update the computing device's location within a subzone or zone.

In an example, program 200, based on user preferences stored on database 170, accesses database 170 and receives an indication that a user is in proximity of one, or multiple zones, when the user is within 25 feet of proximity of one or more zones.

In another example embodiment, the proximity is defined as the user is entering the zone. In this example, program 200, via server 120, receives information that the user has crossed a zone boundary from the strategically placed beacons in the zone. As discussed in step 220, program 200 determines that computing device 110, and the user, have entered the zone and initiates the tracking of computing device 110 through accessing GIS 180. The GIS contains other sensors and/or receivers used by program 200 to determine the location of computing device 110. In this example, program 200 accesses GIS 180 to utilize GPS or triangulation techniques to determine, and update, the physical location of computing device 110 within a zone. Program 200 can also determine, or estimate, and continuously update the location of the computing device based upon monitoring changes in the strength of the signal received by the beacon.

As depicted in FIG. 3, program 200 uses GPS information, from GIS 180 of computing device 110, to determine that computing device 110 is located within zone boundary 305, 310, or 312. Program 200 accesses GIS 180 to utilize GPS or triangulation techniques to determine, and update, the physical location of computing device 110 within a zone. In this example, program 200 temporarily registers the computing device of a user to constantly provide and receive feedback on the location of the user real time as the user moves through the zone as defined by zone boundaries 305, 310, and 312. In another embodiment of FIG. 3, program 200 utilizes beacons 302 and 303 to determine the location of computing device 110 based upon the proximity of computing device 110 to beacons 302 and/or 303. Program 200 determines that computing device 110 is within a zone boundary, defined by zone boundaries 305, 310, and 312, based upon received location information associated with computing device 110 from beacons 302 and 303.

In decision step 240, program 200 determines whether an action associated with the zone boundary is identified. In one embodiment, program 200 determines (from step 230) that the computing device 110, and by inference a user, has entered a zone boundary based on a feedback loop established between program 200 querying GIS 180, on computing device 110, and grants network access credentials to the computing device upon entry into the zone boundary. Program 200 determines whether an action is associated with a zone boundary based on accessing database 170, on server 120, and accessing storage 160, on computing device 110 to determine if metadata in database 170 indicates that the zone includes content of interest to the user, based on user preferences located on storage 160. Program 200 analyzes information, and metadata, stored on database 170 to determine whether the zone boundary includes content of interest to a user in the zone boundary. Further, program 200 determines whether storage 160 includes an indication of an action that is associated with the zone boundary and/or the content of interest to the user in the zone.

In an example, with regard to FIG. 3, a user enters zone boundary 310 (determined in step 230), which is defined by beacons 302 and 303. Computing device 110, of the user, includes an action (stored in storage 160) associated with information 313. Program 200 is capable of initiating actions, which are associated with content within a zone (e.g., information 313), such as activating or deactivating a computing device; activating or deactivating an application located on a computing device; downloading and installing an application to a computing device; activating or deactivating a security protocol on a computing device.

In an example, program 200 is capable of performing actions, such as: delivering geographical location data to a fast food outlet so the food outlet can start preparing food for a customer so that the food is ready just as the customer arrives to collect, or a use locational data provided by program 200 to improve the efficiency of warehouse processes to collect locational data from its delivery vehicles to ensure that goods are removed from storage and made ready for collection.

In this example, program 200 identifies a corresponding action to perform, the identified action including activating a mobile application directed to a promotional item based upon program 200 establishing a feedback loop between storage 160, on computing device 110, and database 170, on server 120. Program 200 identifies the corresponding action by determining that information, or metadata on computing device 110, matches, or is closely related to information, or metadata on database 170.

In another embodiment, program 200 analyzes and juxtaposes information or metadata, from storage 160, on computing device 110, and database 170, on server 120, and does not identify an action associated with the zone. In this example, program 200 does not identify an action associated with the zone based upon the lack information, or metadata, of interest to the user based on user preferences. In response to determining that an action associated with the zone is not identified (decision step 240, "no" branch), program 200 searches for an alternative relevant action (step 250).

A relevant action is an operation that is closely connected to the content that is particular to the zone boundary and can be performed by the computing device. In these embodiments, program 200 searches for an action closely related to the zone that the computing device of the user is occupying.

In step 250, program 200 searches for a relevant action (decision step 240, "no" branch). In this example, the user has crossed into zone boundary 305, and program 200 has failed to identify an action associated with the zone boundary. As discussed in decision step 240, program 200 searches for a relevant action in response to determining that storage 160 does not include an action associated with the zone boundary (e.g., an action associated with zone boundary 305, as defined by beacon 302). In an example embodiment, database 170 includes an indication that information 308 is associated with a relevant action of activating a program to query the computing device of the user to present a website preloaded to the computing device of the user.

In step 260, program 200 initiates the action associated with the zone. In response to identifying an action associated with the zone (decision step 240, "yes" branch), program 200 initiates the action associated with the zone. In an example embodiment, the identified action is activating a mobile application on computing device 110, which is directed to a promotional item. Program 200 initiates this action by querying a sub database to activate the application associated with the zone and zone provider on computing device 110. In this example, the application is capable of presenting information associated with information 313, including a detailed, panoramic display of the item, the key features of the item, and the promotional price of the item. Program 200 can display the program in a default device browser on the computing device of the user.

In an example, program 200 determines that the user has viewed a promotional item on numerous occasions, and sought to place an order for the item which was out of stock at the time. Program 200 can provide a display of details that are relevant to information on the computing device of the user. As discussed in step 240, program 200 identifies an action associated with the zone. In response to identifying an action associated with the zone, program 200 initiates the action associated with the zone boundary defined by beacons 302 and 303. In another example, a shopper has already left the store with a purchase in hand. Program 200 reorders the website and provides a website shortcut to enable the user of the computing device to manually start a relevant website without searching. Computing device of the user presents the user with a new item arrival and a customer loyalty reward (e.g., in the form of $500).

For example, program 200, via a feedback exchange between database 170 on server computer 120, and storage 160 on computing device 110, starts a mobile application and preloads a website in conjunction with the commercial product information on database 170, and the preferences, or past purchases of the user on storage 160, and presents the tagged metadata of the products in the zone boundary the user enters. In this example, the computing device of the user preloads a website associated with the zone boundary that the user entered and presents information on the website specific to shopping deals, coupons, promotional sales, newly acquired products, and information related to the newly acquired products within the zone.

In another embodiment, program 200 determines that a user will enter a zone based upon an analysis of the user's movement pattern in conjunction with the user's history. In an example, program 200 initiates an action associated with the zone contemporaneously with the user entering the zone based upon, as discussed in step 230, the determined proximity of the user to the zone, and the high probability that the user will enter the zone (decision step 240, "yes" branch). Program 200 initiates the action associated with the zone, when the user enters the zone, based upon an analysis, movement pattern, prior history of the user within the zone, and the time that program 200 calculated that the user will enter the zone. Program 200 generates a time until the user enters the zone, based on the previously discussed variables, and synchronizes initiating the action associated with the zone with the estimated time until the user reaches the zone.

Figure 4:
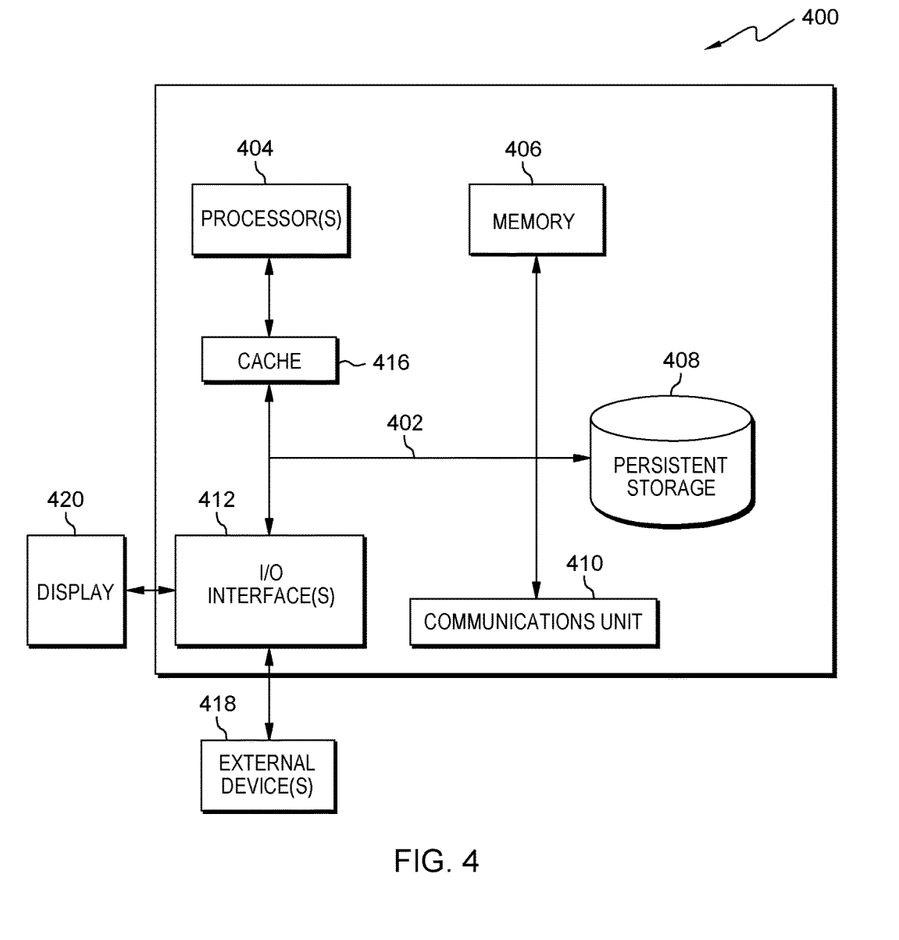
FIG. 4 is a block diagram of components of a computer system, such as the server computer of FIG. 1, in accordance with an embodiment of the present invention.

FIG. 4 depicts a block diagram of components of server 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Program 200 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program 200 may be downloaded to persistent storage 408 through communications unit 410.

I/O interface(s) 412 allows for input and output of data with other devices that may be connected to server 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system comprising:
one or more computer processors
one or more computer readable storage media; and
program instructions stored on computer readable storage media, the program instructions comprising:
program instructions to determine that a user is within a defined proximity to a zone within a venue based on monitoring a computing device of the user moving through the venue;
program instructions to register a globally unique identifier of the computing device of the user with a zone provider associated with the venue, wherein the zone provider is one zone provider of a plurality of zone providers within a venue;
program instructions to update a position of the computing device of the user as the user changes locations within the venue;
program instructions to identify an action associated with the zone, wherein the action includes performing a function of the computing device of the user, wherein identifying the action associated with the zone further comprises:
program instructions to estimate a time that the user will enter the zone;
program instructions initiate the identified action associated with the zone at the estimated time;
program instructions identify content within the zone;
program instructions identify an action associated with the identified content within the zone, wherein the identified action includes initiating display of a webpage associated with the identified content within the zone on the computing device of the user;
program instructions to determine a comparison of features of the identified content within the zone and features of products included in purchase history information of the user;

program instructions to present a promotional product to the user, wherein the promotional product is included in the identified content within the zone, and wherein presenting the promotional product includes presenting the determined comparison of features of the promotional product to the features of products included in purchase history information of the user; and program instructions to responsive to determining the computing device of the user is in proximity to a zone boundary, identify, an action associated with the zone boundary, wherein the action is presenting an application for download to the computing device of the user, and wherein the identified actions include initiating display of webpage associated with the identified content within the zone on the computing device of the user, activating an e-commerce website that displays one or more products related to a recently purchased product, activating a computing application, presenting a user with an instruction manual of the recently purchased product, automatically deactivating a computing device, downloading a security protocol, uploading the computing application to a computing device, and installing the computing application to the computing device;

program instructions to initiate the identified action associated with the zone on the computing device of the user, wherein the action is presenting an application for download to the computing device of the user; and program instructions to, in response to determining that an action associated with the zone is not present, identify a relevant action to perform on the computing device, wherein the relevant action is an operation to perform on the computing device that is associated with content that is located within another zone from another zone provider and wherein the operation is identified based on user preferences, wherein the user preferences indicates to automatically order a product from another zone provider when the product is not present in the zone and the user has exhausted a supply of the product as determined from the purchase history information of the user, and wherein identifying the relevant information further comprises:

program instructions to determine one or more products of interest to the user by analyzing the purchase history information of the user located on one or more applications, the one or more applications including financial applications, e-commerce applications.

* * * * *